(12) United States Patent
Bladon et al.

(10) Patent No.: US 8,127,444 B2
(45) Date of Patent: Mar. 6, 2012

(54) FANS AND TURBINES

(76) Inventors: Christopher George Bladon, Ellesmere (GB); Paul Douglas Bladon, Ellesmere (GB)

( * ) Notice: Subject to any disclaimer, the term of this patent is extended or adjusted under 35 U.S.C. 154(b) by 1075 days.

(21) Appl. No.: 10/546,884

(22) PCT Filed: Feb. 26, 2004

(86) PCT No.: PCT/GB2004/000774
§ 371 (c)(1),
(2), (4) Date: Aug. 24, 2006

(87) PCT Pub. No.: WO2004/076111
PCT Pub. Date: Sep. 10, 2004

(65) Prior Publication Data
US 2007/0039178 A1    Feb. 22, 2007

(30) Foreign Application Priority Data
Feb. 26, 2003 (GB) .................... 0304321.3

(51) Int. Cl.
*B23P 15/04* (2006.01)
(52) U.S. Cl. .................... 29/889.23; 29/889.7
(58) Field of Classification Search ............ 29/557, 29/889.23, 889.7
See application file for complete search history.

(56) References Cited

U.S. PATENT DOCUMENTS

| 3,288,699 | A |   | 11/1966 | Trager |
|---|---|---|---|---|
| 3,372,099 | A |   | 3/1968 | Clifford |
| 3,642,601 | A |   | 2/1972 | Kondo |
| 4,263,116 | A | * | 4/1981 | Inoue ................ 204/224 M |
| 4,601,224 | A | * | 7/1986 | Clark, III ................ 83/74 |
| 4,770,574 | A |   | 9/1988 | Lotz |
| 4,891,485 | A |   | 1/1990 | Brifford |
| 5,014,421 | A |   | 5/1991 | Swarden et al. |
| 6,119,567 | A | * | 9/2000 | Schindler et al. ........ 83/171 |
| 2003/0024825 | A1 | * | 2/2003 | Lamphere et al. ....... 205/640 |

FOREIGN PATENT DOCUMENTS

| EP | 0426233 A1 | 8/1991 |
|---|---|---|
| EP | 1211009 A1 | 11/2001 |
| EP | 1433557 A | 6/2004 |
| JP | 06320346 | 11/1994 |

* cited by examiner

*Primary Examiner* — David Bryant
*Assistant Examiner* — Jacob Cigna
(74) *Attorney, Agent, or Firm* — Ober, Kaler, Grimes & Shriver; Royal W. Craig

(57) ABSTRACT

Overlapping twisted radial aerofoil blades or vanes (70) are formed on a compressor rotor or turbine disk or the like (68) by electro-discharge machining with a curved round section wire tool electrode (72) which is turned by a tool holder (28) as it is advanced on a helical path to form the inner surface of each blade or vane with the outer curve of the wire, or the outer surface of each blade or vane with the inner curve of the wire, the disk being indexed to a next rotary position after each blade surface is machined.

20 Claims, 2 Drawing Sheets

FANS AND TURBINES

Figure 1:
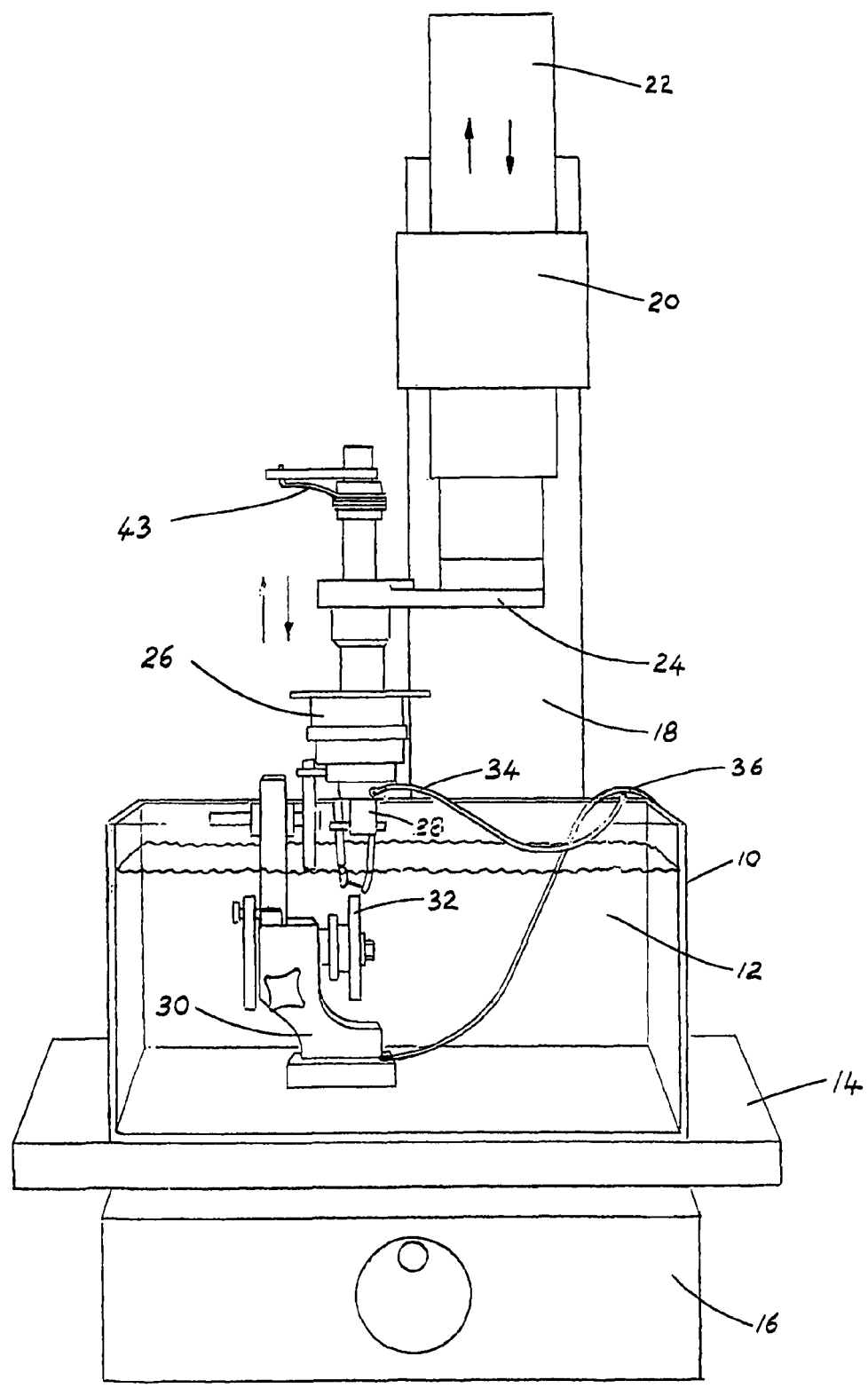

This invention relates to a process, method and apparatus, with particular reference to the manufacture of fans and turbines (for dynamic interaction with fluid flows) and guide vanes (for static interaction with fluid flows), especially for use in turbomolecular pumps and in gas turbine engines.

Gas turbine engines are a widely used form of internal combustion engine and are in many senses more efficient than reciprocating engines operating on the two- or four-stroke principle. In particular, for a given size, the gas turbine can give a higher power output.

Much gas turbine development has concentrated on relatively large power plants for large power outputs, exemplified by turbojet and turbofan engines for aeronautical use. In scaling down the size of such engines, engineering problems are met as dimensions decrease. Some of these problems are to do with the difficulties of further miniaturisation at a manufacturing level, and some to do with the behaviours of gas flows in relatively small spaces.

The present invention addresses aspects of gas turbine engine construction that are particularly applicable to very small gas turbines. Such engines are exemplified by a particular embodiment given as an example herein, where the invention is applied to the manufacture of components for a turbojet engine with an overall diameter of about 10 cm and length of about 32 cm, developing 110N (271b) of thrust at an engine speed of 90,000 rpm.

In the general form of a gas turbine, a rotary compressor raises the pressure of intake air, at least some of the air is passed to a combustion chamber or chambers where fuel is burned, exhaust gases drive a turbine as they pass to an exhaust nozzle, and the turbine drives the compressor by an engine shaft.

Gas flow through the engine is highly influenced by a number of static and moving surfaces, typically including fan blades on the successive rotating discs of a multistage axial compressor, stator vanes between each pair of adjacent discs and after the last disc, static nozzle guide vanes between the combustion chamber and turbine, and the rotating turbine blades.

The vanes and blades are likely to be of aerofoil cross section. They are arranged in a substantially radial alignment (as in the spokes of a wheel). The velocity of the axial gas flow through the engine changes from one axial location to the next. At any given axial location in the compressor or turbine section of the engine, the axial gas velocity is intended to be substantially uniform across the diameter of the engine. Since, in the case of rotary fans and turbines, the outer tips of the blades are moving much faster than their inner roots, and because of centrifugal effects, the blades on rotary components are designed to compensate. The blade section changes with radial distance from the centre. Typically, the blades appear twisted along their length, with the least stagger angle at the root and the greatest stagger angle at the tip.

These vanes and blades are conventionally made by casting or machining each blade out of a suitable strong and heat resistant metal alloy. After each individual blade is made, it must be fixed into position on a suitable compressor or turbine hub. This process requires suitable connecting means for making connections between the adjacent parts. In a smaller engine, more precision is required in such means, because any misalignments will be proportionally more significant. The connecting means should be strong, but light in weight. Bonding techniques are used in some cases to attach cast turbine blades to a central rotary disc. In the case of rotary blade discs, a balancing operation will be necessary after assembly.

In the case of a very small engine, a disc might be cast with integral blades, but there are serious problems due to the proximity of adjacent blades, and their twisted forms. While the casting operation as such is technically feasible, the construction of the pattern is exceedingly difficult, and might almost be considered impossible, to construct and use a jig to achieve correct and uniform blade angles, radii and spacings and the like.

In the example of a miniature jet engine given above, the compressor and turbine discs, including blades, may be about 8 cm in diameter, blade tip to blade tip, carrying between 24 and 40 closely spaced thin aerofoil blades, whose chord lengths and stagger angles vary over the lengths of the blades to result in substantial overlap between neighbouring blades both axially and radially. The problem of constructing such bladed discs has for a long time been intractable.

In accordance with the invention, the problem of accurately forming a closely spaced radial array of overlapping shaped blades or vanes, particularly for use in an axial compressor or turbine in a gas turbine engine, and especially in a miniature gas turbine engine, is addressed by removing material from a solid blank to leave the blades or vanes upstanding as the residual material of the blank, removal being effected by a change of state of the material induced by proximity to an advancing tool, the tool being in the form of a shaped wire, and the tool turning as it advances, whereby to generate a surface of a said shaped blade or vane.

For the purpose of forming rings of compressor blades or turbine fans, we envisage electro-discharge machining, also known as spark erosion, using a turning wire tool electrode, as the only practical material removal method at the present time. However, alternatives may in future be developed, using another source of intense local heating than an electric discharge, or a different change of state mechanism, that provide a viable alternative.

In a more specific aspect, the invention comprises a process for forming, in the body of a workpiece blank having a thickness across an edge surface, a row of twisted aerofoil blades extending towards the said edge, comprising holding a shaped wire electrode in a holder, positioning the holder to orient the wire electrode across the thickness of the edge surface, advancing the electrode towards the edge surface of the blank, causing a high tension discharge between the wire electrode and the workpiece blank whereby to erode portions of the workpiece ahead of the tool electrode and thereby form a first groove across the edge of the blank, advancing the tool into the groove to deepen the first groove, and turning the tool holder during said advance to give the first groove a helical form; and forming second and further similar adjacent grooves in the workpiece blank in a similar manner whereby the residual workpiece body between pairs of adjacent grooves has the form of a twisted aerofoil blade.

As soon as the advancing tool holder has turned by more than a very small angle, the wire electrode will start to undercut the workpiece body destined to form the next adjacent blade. This allows the adjacent blades to be closely spaced, and to overlap when viewed in the direction of advance of the tool.

In a preferred application, the invention is used for forming, from a blank disc-like workpiece having a thickness across a circumferential edge surface, a hub carrying a plurality of radial twisted aerofoil blades, by advancing the tool holder radially inwardly when forming each groove. The blades may thus overlap when viewed radially of the hub, and also when viewed axially of the hub.

The invention also provides apparatus for forming a closely spaced radial array of overlapping shaped blades or vanes, comprising means for advancing a shaped wire tool towards a solid blank to remove material therefrom by a change of state of the material induced by proximity to the advancing tool, whereby to leave blades or vanes upstanding as the residual material of the blank, and means for turning the tool as it advances, whereby to generate a surface of a said shaped blade or vane.

More particularly, the invention provides apparatus for forming, in the body of a workpiece blank having a thickness across an edge surface, a row of twisted aerofoil blades extending towards the said edge, comprising a shaped wire electrode held in a holder, positioning means for orienting the wire electrode across the thickness of the edge surface, means for advancing the electrode towards the edge surface of the blank, means for causing a high tension discharge between the wire electrode and the workpiece blank whereby to erode portions of the workpiece ahead of the tool electrode and thereby form a first groove across the edge of the blank, means for advancing the tool into the groove to deepen the first groove, and means for turning the tool holder during said advance to give the first groove a helical form.

Preferably there is also provided indexing means for indexing the workpiece blank through a sequence of positions at which successive deep helical grooves may be formed by the electrode. There will also normally be provided means for retracting the wire electrode along its advancement path in order to withdraw it from each formed groove, to permit the workpiece to be indexed to its next position or moved for any other purpose.

Means may also be provided for moving the workpiece or the holder laterally during advance of the wire into the groove, so that the groove is formed at a slight incline. In this way, a blade can be formed between two oppositely inclined grooves, so that it is slightly tapered, being marginally thicker at its base than at its tip. This is a more efficient weight and bulk distribution in a turbine or compressor blade than a constant cross section throughout the blade length.

The product of the process and apparatus is typically a compressor disc, or turbine disc, comprising a hub carrying radially outwardly directed twisted aerofoil blades, for rotation at high speed in a gas turbine engine; or a turbine guide vane disc or the like, which may be of similar appearance, but is static in the engine. However it should be noted that even in the case of radial blades or vanes, variations are possible. For example, instead of having an inner hub and outwardly extending blades, the disc may have a continuous outer rim, from which blades extend radially inwardly towards a vacant centre. Such blades may be formed in accordance with the invention by advancing the tool electrode wire radially outwardly from an apertured centre towards the rim. This is an arrangement that may be chosen for manufacturing discs of compressor stator vanes, to be located between the rotors of the successive stages of a multistage axial flow compressor.

The shaped wire electrode is so called because its shape, together with its orientation in its holder, and the chosen relation between the advance and the rotation of the holder, governs the final shape of the blade contour generated by its motion. At the simplest, the shape may be rectilinear, but this will not generate an aerofoil surface in a single pass. It is much preferred to curve the wire, and generally a simple circular arc will suffice, optionally between non-circular opposite ends of the wire. The curve should be smooth. Sharp or abrupt changes in shape are generally to be avoided, to minimise stress concentrations in the formed blades, and to promote the desired airflow over them.

The wire is most suitably standard round wire. This gives the positive benefit of generating a rounded root at the base of each blade, at each side thereof, at the bottom of each groove. This is highly desirable to avoid stress concentrations and promote a long service life.

The thickness of the wire defines the minimum spacing between adjacent blades. As the desired spacing increases, a second pass of the wire into the blank broadens the groove; as the desired spacing increases further, a new groove will need to be cut, in which case unwanted workpiece material between the grooves needs to be removed by suitable means to give clear space between adjacent blades. Suitable means can include means for moving the wire holder sideways, or for moving the workpiece sideways, to use the wire to cut a lateral groove joining the bases of two adjacent radial grooves and remove the unwanted material in one piece.

Because the shaped curved wire has a real thickness, the inner edge of the curve has a smaller radius than the outer edge. The inner radius of the curved wire defines the outer curve of the blades, while the outer radius of the curved wire defines the inner curve of the blades. Accordingly, the same wire can be used to form both sides of the blades into a curved aerofoil section, having thin opposite side edges and a thicker centre portion, in a long and narrow crescent shape, with a flatter inner surface and a more curved outer surface. However, it is usually preferable to use different radius curved wires for the inner and outer faces of the blades in order to achieve the correct aerofoil shape and cross section. The thickest part of the section is preferably towards the leading edge of each blade.

As the wire advances, in its holder, along the length of a blade, defining that surface of the blade, a twist is generated in the blade by slowly rotating the holder. It would be most unusual for a twist of more than 90° to be required. Rotation of the holder may be achieved by any suitable means, from a mechanical guide, as illustrated in the accompanying drawings, to electrical or electronic means, using stepper motors or programmable twist controls or in any other way.

Figure 2:
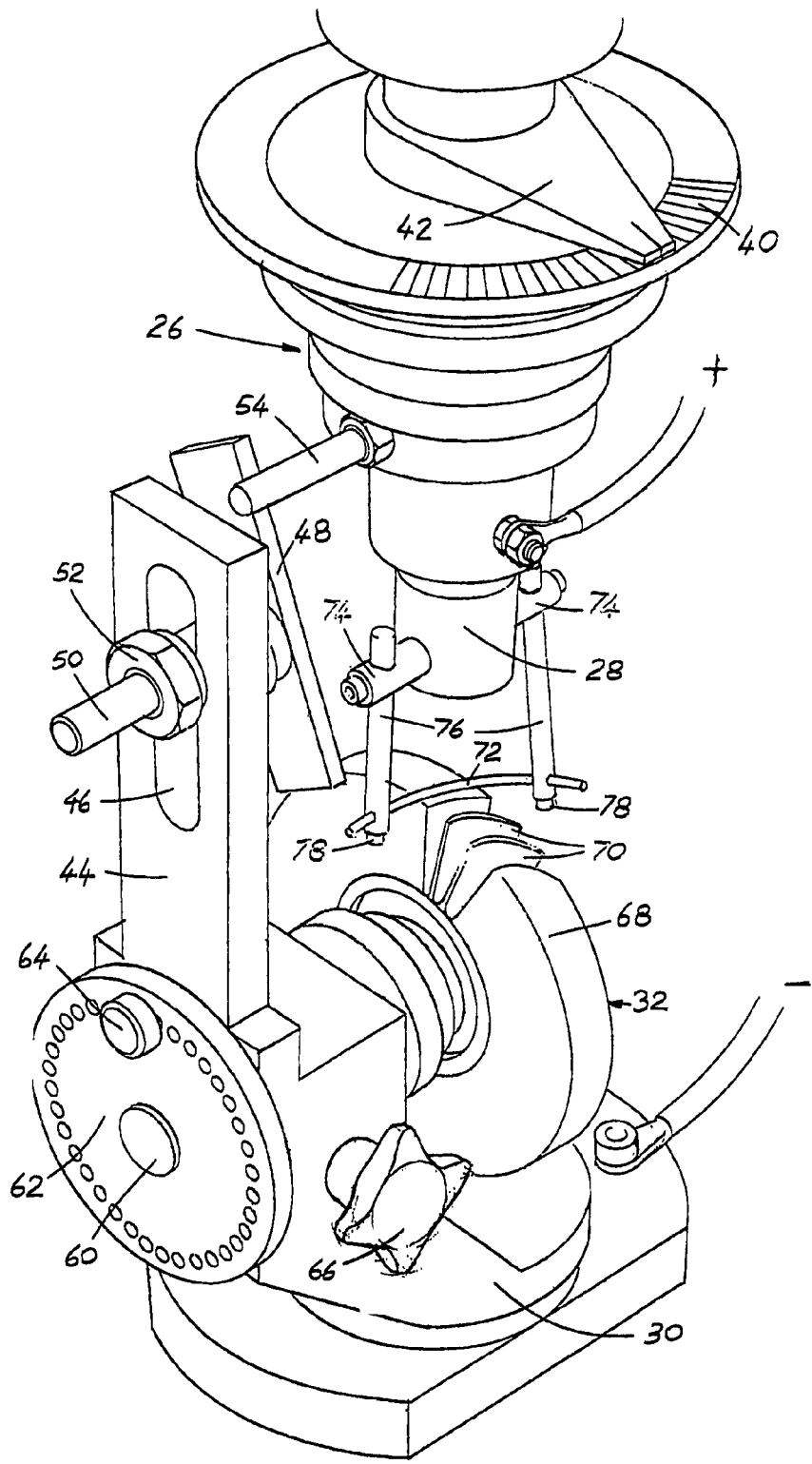

Further aspects of the invention are discussed below in relation to the embodiment which is illustrated, by way of example only, in the accompanying drawings. In the drawings:

FIG. 1 is a perspective illustration of spark erosion apparatus for forming a turbine disc in accordance with the invention; and FIG. 2 is a perspective illustration of part of the apparatus shown in FIG. 1, from a different and closer viewpoint.

Referring first to FIG. 1, the illustrated apparatus comprises a tank 10 containing a suitable liquid quenching medium 12, which is a dielectric fluid such as a suitable paraffin oil or water based alternative, in which to conduct spark erosion operations. The tank is supported by a platform 14, under which is a housing 16 for the necessary electrical and control equipment, which is of any kind that is in itself known in the art.

Behind tank 10, as shown, is a pillar 18. Towards its upper end the pillar carries a hydraulic drive 20, which moves a drive column 22 up and down under the control of the equipment in housing 16. An electronic servo drive may be an acceptable alternative. The lower end of the drive column carries a horizontal support arm 24, which carries tool holder head 26, to be described in more detail in relation to FIG. 2. The tool holder head carries tool holder 28.

Within tank 10, immersed in the liquid 12, is a pedestal 30, which carries a workpiece 32 vertically below the tool holder 28. FIG. 1 shows a positive electrical conductor cable 34 extending from the tool holder, and a negative or earth electrical conductor cable 36 extending from the pedestal, both leading to an electrical power source in housing 16. This power source is of the usual kind for spark erosion.

FIG. 2 shows more detail of the tool holder and pedestal.

The tool holder head 26 includes a rotation scale 40 and rotation scale pointer 42, to indicate the angular displacement of the actual tool holder 28, under the rotation scale, about a vertical axis, in relation to an arbitrary zero. This is possible because the tool holder can be turned about this axis, by the application of an external force, and against the resistance of an external adjustable tension return spring 43 (FIG. 1), away from a stop towards which the spring constantly urges it. The zero position of rotation may be taken to be the position of the tool holder against that stop.

The pedestal is surmounted by a guide support column 44, in which is formed a vertical slot 46. A guide ramp 48 is mounted on the head of a ramp mounting bolt 50 which passes through slot 46 and is clamped at a chosen position therein by nut 52. In clamping the ramp mounting bolt, the operator sets not only the height of the ramp, but also its angle.

Guide ramp 48 is made of a low friction, electrically insulating material, such as a polyamide polymer.

Tool holder 28 is provided with a laterally extending guide pin 54 which is located so that, if tool holder head 26 is lowered by the action of hydraulic drive 20 towards workpiece 32, the guide pin engages the top surface of the guide ramp and starts to turn the tool holder against the action of its return spring, to a degree indicated by scale pointer 42 over rotation scale 40. If the tool holder head is then raised by drive 20, the action of the return spring keeps the guide pin in contact with the ramp surface, so that all motion is exactly reversed. It will be understood that the relation between the rotation of the tool holder and the advance of the tool holder is controlled entirely by the profile, height and inclination of the surface of guide ramp 48 which governs the motion of guide pin 54.

Workpiece 32 is mounted on pedestal 30 in a rotary manner on a spindle 60 on a horizontal indexing axis; its rotational position is controlled manually by indexing wheel 62, the various indexing positions being selected by indexing peg 64, the whole being manually lockable by indexing clamp 66. In production applications, an electronic automatic indexing control coupled to the spark erosion control equipment in housing 16 (FIG. 1) may conveniently be used in place of the manual indexing wheel 62, peg 64 and clamp 66.

In this illustrated embodiment, the workpiece is a disc, suitable for forming into a turbine disc with radial blades around a central hub. The disc has an edge surface 68, into which grooves are formed as described below, to form the blades, two of which are shown for illustrative purposes at 70.

In order to form the grooves, the tool holder carries a curved wire tool electrode 72. This is mounted on the tool holder in a universal mounting comprising two diametrically opposed adjustable wire holder clamps 74, each determining the position and orientation of a respective wire holder arm 76. The electrode wire itself passes through a hole in the lower end of each holder arm, in each of which it is clamped by a screw 78 at a selected rotational orientation and a selected position along its curved length.

It will be appreciated that the wire is thus mounted in the tool holder above the workpiece disc, lying across the disc edge at a precisely chosen position and orientation, with a specific curve presented towards the workpiece, immersed in a quenching liquid, ready for electro-discharge machining of the turbine blades to begin. The process proceeds, and the apparatus functions, as set out in the preceding general and specific descriptions in this specification.

In this example, the workpiece is aluminium alloy, with a diameter of 76 mm and an edge thickness of 4 mm. The wire is pure copper, with a diameter of 1.6 mm. Satisfactory erosion rates of 2 mm/min are achievable, even in an experimental rig, at a current of 3 amps and voltage of 80 volts. The rate of advance of the hydraulic drive, and electrical current on/off switching, is controlled by the usual equipment, contained in housing 16. The rate of erosion of material from the workpiece depends on the current flowing, which is limited by the wire size.

Although FIG. 2 shows two blades 70 already formed, in practice it may be found more convenient to set up the electrode wire to form one surface of each blade, either the inner or the outer surface, at the positions determined by the allowed positions of the indexing wheel, before offsetting and adjusting the position of the electrode wire, by means of the adjustable wire holder clamps and the wire holder arms, to form the other surface of each blade at the same indexing positions. If necessary, any remaining attached portions of the workpiece disc 32 between adjacent blades 70 are finally removed.

The invention claimed is:

1. A method of forming a closely spaced radial array of overlapping shaped twisted airfoil blades for use in an axial compressor or turbine in a gas turbine engine, respectively by removing material from a solid blank disk to leave the twisted airfoil blades upstanding as the residual material of the solid blank disk, each airfoil blade comprising a concave pressure side and opposed convex suction side extending axially between opposing side edges and twisted lengthwise, comprising the steps of:

mounting said solid blank disc on a spindle for rotation about a first axis;

manipulating a tool in proximity of said solid blank disc to remove portions thereof, said tool comprising a fixed length of shaped wire held fixedly clamped in a holder, said holder being both rotatable and extendable about a second axis to selectively advance or withdraw said shaped wire to and from said solid blank disc and to orient the wire tool in relation to the solid blank disc, said holder turning as it advances thereby changing both orientation and proximity of the tool in relation to the solid blank disc, said tool manipulating step further comprising the substeps of, advancing said holder along said second axis to bring said wire tool in edgewise proximity of said solid blank disc, advancing and concurrently rotating said holder about said second axis while radially cutting through said solid blank disc, retracting and concurrently counter-rotating said holder about said second axis to remove said wire tool, rotating said spindle to rotate the solid blank disc;

repeating said advancing and retracting substeps to define a twisted airfoil blade on said solid blank disc;

whereby to generate a surface of a said twisted airfoil blade in which the shape of the surface so generated is governed by the shape of the wire tool and orientation of the wire tool in the tool holder, and also by the relation between the advance and the rotation of the holder.

2. A method according to claim 1, wherein the removal is effected by electro-discharge machining using a turning wire tool electrode.

3. The method according to claim 1, wherein said axial compressor comprises a hub carrying radially outwardly directed twisted airfoil blades for a turbomolecular pump.

4. The method according to claim 1, wherein said turbine comprises a hub carrying radially outwardly directed twisted airfoil blades for a miniature gas turbine engine.

5. A method according to claim 1, wherein the fixed length of shaped wire is held fixedly clamped between two opposed wire holder clamps during said step of advancing and concurrently rotating said holder about said second axis.

6. A process for forming, in the body of a workpiece blank having a thickness across an edge surface, a row of twisted airfoil blades extending towards the said edge, each airfoil blade comprising a concave pressure side and opposed convex suction side extending axially between opposing side edges and twisted lengthwise, comprising the steps of:
- clamping a fixed length of shaped wire electrode fixedly in a holder between opposed clamps,
- positioning the holder to orient the wire electrode across the thickness of the edge surface,
- advancing the electrode towards the edge surface of the blank, causing a high tension discharge between the wire electrode and the workpiece blank whereby to erode portions of the workpiece ahead of the tool electrode and thereby form a first groove across the edge of the blank,
- advancing the electrode into the groove to deepen the first groove, and
- turning the tool holder during said advance to change the orientation of the wire tool in relation to the blank and give the first groove a helical form with a surface shape governed by the shape of the fixed length of shaped wire electrode between said opposed clamps together with its orientation in the tool holder, and also by the relation between the advance and the rotation of the holder; and
- forming second and further similar adjacent grooves in the workpiece blank in a similar manner whereby the residual workpiece body between pairs of adjacent grooves has the form of a twisted airfoil blade.

7. A process according to claim 6, wherein the adjacent blades are closely spaced, and overlap when viewed in the direction of advance of the holder.

8. A process according to claim 6, comprising forming, from a blank disc-like workpiece having a thickness across a circumferential edge surface, a hub carrying a plurality of radial twisted airfoil blades, by advancing the holder radially inwardly when forming each groove.

9. A process according to claim 6 wherein the blades thus formed overlap when viewed radially of the hub, and the blades thus formed overlap when viewed axially of the hub.

10. Apparatus for forming a closely spaced radial array of overlapping shaped airfoil blades each defined by a concave pressure side and opposed convex suction side extending axially between opposing side edges and twisted lengthwise, comprising a shaped wire tool holder having opposed wire clamps and a fixed length of wire fixedly clamped at two selected positions along said fixed length of wire by the opposed clamps of said wire tool holder, and means for advancing the tool holder towards a solid blank to remove material therefrom by a change of state of the material induced by proximity to the advancing wire, whereby to leave twisted airfoil blades upstanding as the residual material of the blank, and means for turning the tool holder as it advances to change the orientation of the wire in relation to the blank, whereby to generate a surface of a said shaped blade or vane in which the shape of the surface so generated is governed by the shape of the wire between the clamps of said wire tool together with its orientation in the tool holder, and also by the relation between the advance and the rotation of the holder.

11. Apparatus according to claim 10 wherein the fixed length of wire is an electro-discharge machining electrode.

12. Apparatus for forming, in the body of a workpiece blank having a thickness across an edge surface, a row of twisted airfoil blades extending towards the said edge, each airfoil blade comprising a concave pressure side and opposed convex suction side extending axially between opposing side edges and twisted lengthwise, the apparatus comprising a shaped wire tool electrode including a segment of wire electrode held fixedly clamped at two selected positions along said segment of wire in a holder between opposed wire clamps, positioning means for orienting the holder so that the wire electrode extends across the thickness of the edge surface, means for advancing the holder and the electrode towards the edge surface of the blank, means for causing a high tension discharge between the wire electrode and the workpiece blank whereby to erode portions of the workpiece ahead of the tool electrode and thereby form a first groove across the edge of the blank, means for advancing the tool into the groove to deepen the first groove, and means for turning the tool holder during said advance to change the orientation of the tool in relation to the blank and give the first groove a helical form with a surface shape governed by the shape of the wire tool together with its orientation in the tool holder, and also by the relation between the advance and the rotation of the holder.

13. Apparatus according to claim 12 further comprising indexing means for indexing the workpiece blank through a sequence of positions at which successive deep helical grooves may be formed by the electrode.

14. Apparatus according to claim 12 comprising means for retracting the wire electrode along its advancement path in order to withdraw it from each formed groove.

15. Apparatus according to claim 12 comprising means for moving the workpiece or the holder laterally during advance of the wire into the groove, so that the groove is formed at a slight incline.

16. Apparatus according to claim 12 wherein the wire electrode is round wire.

17. Apparatus according to claim 12 comprising means for moving the wire holder sideways, or for moving the workpiece sideways, to use the wire to cut a lateral groove joining the bases of two adjacent radial grooves and remove the material between them in one piece.

18. Apparatus according to claim 12 wherein the shaped wire electrode is curved in an arc between said opposed wire clamps.

19. Apparatus according to claim 18 wherein the inner radius of the curved wire defines the outer curve of the blades, and the outer radius of the curved wire defines the inner curve of the blades.

20. Apparatus according to claim 18 wherein the inner curve of the blades is flatter than the outer curve, so that the airfoil section of the blades has thin opposite side edges and a thicker center portion.

* * * * *